(12) United States Patent
Wang et al.

(10) Patent No.: US 8,896,657 B2
(45) Date of Patent: Nov. 25, 2014

(54) SCENE VIDEO SWITCH SYSTEM AND SCENE VIDEO SWITCH METHOD

(75) Inventors: Xiaomeng Wang, Beijing (CN); Shengyin Fan, Beijing (CN); Weitao Gong, Beijing (CN); Xin Wang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 436 days.

(21) Appl. No.: 13/324,179

(22) Filed: Dec. 13, 2011

(65) Prior Publication Data

US 2012/0182377 A1    Jul. 19, 2012

(30) Foreign Application Priority Data

Jan. 19, 2011  (CN) .......................... 2011 1 0021338

(51) Int. Cl.
*H04N 7/14*         (2006.01)
(52) U.S. Cl.
USPC .................. 348/14.07; 348/14.08; 348/14.14; 370/260; 379/202.01; 709/204
(58) Field of Classification Search
USPC .................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 6,611,281 B2 | 8/2003 | Strubbe | |
| 7,580,054 B2 | 8/2009 | Rui et al. | |
| 2002/0114534 A1* | 8/2002 | Nakamura et al. | 382/276 |
| 2007/0237393 A1* | 10/2007 | Zhang et al. | 382/173 |
| 2009/0015658 A1* | 1/2009 | Enstad et al. | 348/14.08 |
| 2010/0103245 A1* | 4/2010 | Decker et al. | 348/14.09 |
| 2012/0127262 A1* | 5/2012 | Wu et al. | 348/14.09 |

* cited by examiner

*Primary Examiner* — Hemant Patel
(74) *Attorney, Agent, or Firm* — Oblon, Spivak, McCelland, Maier & Neustadt, L.L.P.

(57) ABSTRACT

Disclosed are a scene video switch system and a scene video switch method. The system comprises an input unit configured to input an image currently captured by a video capture unit to serve as a current image; a detection unit configured to detect all of interesting elements and latent elements in the current image so as to determine a maximum possible existing area of the interesting elements; a state switch unit configured to carry out, by using a predetermined finite state machine, switching between scene states of the maximum possible existing area according to predetermined different scene states and switching conditions; and a display unit configured to extract, based on a current scene state switched by the state switch unit, an area of concern coinciding with the current scene state from the maximum possible existing area to serve as a scene video for display.

9 Claims, 6 Drawing Sheets

| σ | WHOLE SCENE | SPEAKER SCENE | KEY ROLE SCENE | SINGLE SCENE |
|---|---|---|---|---|
| WHOLE SCENE | – | a | – | f1 |
| SPEAKER SCENE | – | b | c | f2 |
| KEY ROLE SCENE | e | d | – | f3 |
| SINGLE SCENE | – | – | g | h |

| σ | WHOLE SCENE | SPEAKER SCENE | KEY ROLE SCENE |
|---|---|---|---|
| WHOLE SCENE | – | a | – |
| SPEAKER SCENE | – | b | c |
| KEY ROLE SCENE | e | d | – |

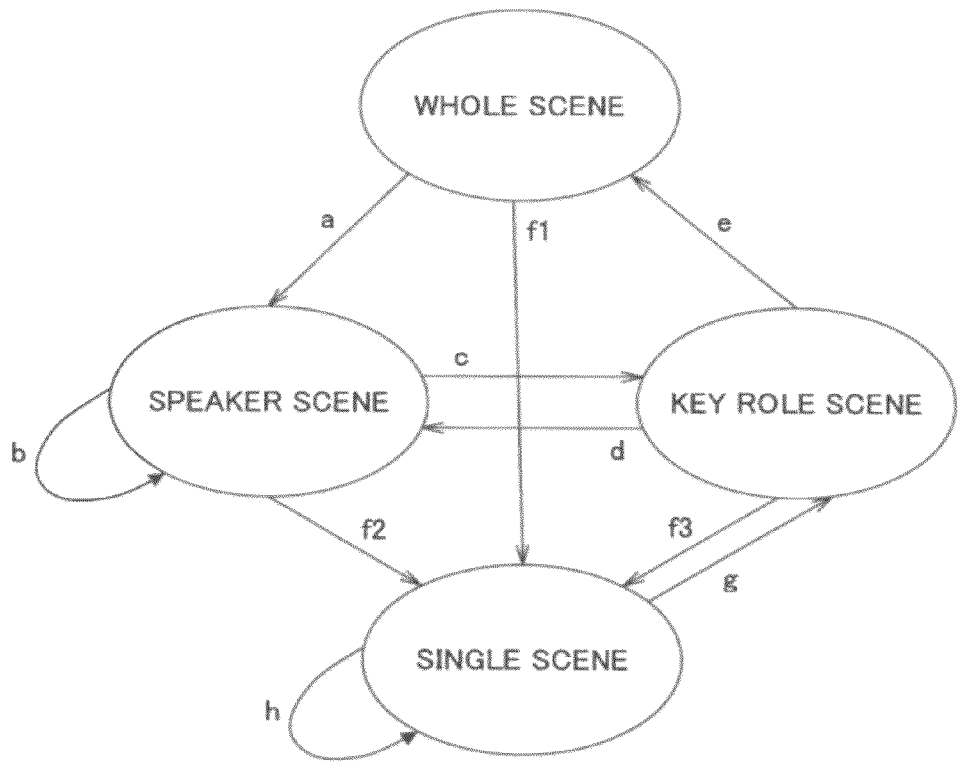

SCENE VIDEO SWITCH SYSTEM AND SCENE VIDEO SWITCH METHOD

BACKGROUND OF THE INVENTION

1. Field of the Invention

The present invention relates to a scene video switch system based on dynamic detection of an area of concern and a scene video switch method based on the dynamic detection of the area of concern.

2. Description of the Related Art

With the developments of video compression techniques and video enhancement techniques, remote video systems have been widely used (particularly in the business field) in recent years. A typical representative of the remote video systems is, for example, a remote video conference system or a remote medical care system in which a video capture unit and a video display unit are placed in at least two terminals, respectively, and the terminals are made able to communicate with each other by employing a wired or wireless communication unit so that users of the terminals may acquire real-time or off-line videos from each other. In an application of the remote video system, by dynamically detecting an area of concern and emphasizing the scene of the area of concern, it is possible to dramatically improve the user-friendly interaction of the remote video system.

Up to now, the following techniques have been proposed with regard to changing a displayed scene by dynamically detecting an area of concern.

According to the technique proposed in the below cited reference No. 1, an area of concern is dynamically detected and optimally displayed, whereas display of an area of unconcern is omitted. In this technique, based on different contents of an area of concern, a size ratio of a display area may be automatically adjusted. However, in this reference, an area of concern is just limited to a human face; that is, the size of an image is proportional to the size of the human face, and scene states in a video conference are not classified. On the other hand, if the size of an area of concern is relatively small, the video quality may be negatively influenced when only carrying out equal proportional enlargement.

The below cited reference No. 2 provides a technique of utilizing a full-angle camera head to capture a conference and being able to provide real-time and off-line video display for users. This technique includes an automatic camera head management system for controlling the camera head and an analysis module for positioning those who are present (i.e. attendees). However, in this reference, it is necessary to use a full-angle camera head or an array formed of plural general camera heads to provide a video of each of the attendees; as a result, this is a very heavy burden on the aspect of hardware apparatus. Furthermore the users may only carry out switching between videos of a single attendee so that important information of areas of concern of other attendees may be lost.

The below cited reference No. 3 utilizes a video detection technique to carry out detection of attendees in a video captured by a camera head, and then based on the detected positions and size information of the attendees, automatically adjusts the orientation and zoom proportion of the camera head so that a best video including all of the attendees may be provided. However, this reference may only provide a video including all of the attendees; in other words, there is a limitation on the aspect of a video of one single attendee. Furthermore, in this reference, departure of some of the attendees may be effectively detected. However, as for attendance of new attendees, this technique carries out audio information positioning outside the detection area; as a result, there is a certain limitation too.

The below cited reference No. 4 provides a method of tracking plural attendees in a video conference. This method includes a step of monitoring the video conference; a step of creating video positioning information; a step of creating audio positioning information; and a step of adjusting parameters of a camera head based on the video positioning information and the audio positioning information. In this reference, only switching between a scene video of a speaker and a scene video of all the attendees may be carried out, and only by carrying out detection and positioning with regard to the video and audio of the speaker, the video may be switched to the speaker. In addition, since this method cannot carry out dynamic detection and switching between areas of concern, and cannot provide extension of a scene, in a case where new attendees enter or present attendees leave the conference, this method cannot carry out automatic adjustment on the video.

Since an area of concern of users is changeable during a video conference, all of the techniques described in the above relevant references cannot provide a best video for the users during the whole conference. For example, the reference No. 4 may only provide two selectable scene videos, but cannot carry out dynamic detection of an area of concern and the corresponding scene state switching. The reference No. 2 may provide videos of difference scenes, but this calls for dramatically increased hardware at the same time; also dynamic detection of an area of concern and the corresponding scene state switching cannot be carried out. In addition, although the reference No. 1 mentions video display based on an area of concern, the defined area of concern is limited, dynamic detection of the area of concern and the corresponding scene state switching cannot be carried out, and the visual quality of the scene video is not ideal in some cases.

Cited Reference No. 1: US Patent Application Publication No. 2010/0103245 A1

Cited Reference No. 2: U.S. Pat. No. 7,580,054 B2

Cited Reference No. 3: US Patent Application Publication NO. 2009/0015658 A1

Cited Reference No. 4: U.S. Pat. No. 6,611,281 B2

SUMMARY OF THE INVENTION

The present invention is proposed for overcoming the above mentioned disadvantages in the conventional techniques. In embodiments of the present invention, a scene video switch system based on dynamic detection of an area of concern and a scene video switch method based on the dynamic detection of the area of concern are provided. Here it should be noted that in what follows, the dynamic detection of an area of concern is called as "area-of-concern dynamic detection".

According to one aspect of the present invention, a scene video switch system based on area-of-concern dynamic detection is provided. The scene video switch system comprises an input unit configured to input an image currently captured by a video capture unit to serve as a current image; a detection unit configured to detect all of interesting elements and latent elements in the current image input by the input unit so as to determine a maximum possible existing area of the interesting elements; a state switch unit configured to carry out, by using a predetermined finite state machine, switching between scene states of the maximum possible existing area according to predetermined different scene states and switching conditions; and a display unit configured to extract, based on a current scene state switched by the state switch unit, an area of concern coinciding with the current scene state from the maximum possible existing area to serve as a scene video for display.

According to another aspect of the present invention, a scene video switch method based on area-of-concern dynamic detection is provided. The scene video switch method comprises an input step of inputting an image currently captured by a video capture unit to serve as a current image; a detection step of detecting all of interesting elements and latent elements in the current image input by the input step so as to determine a maximum possible existing area of the interesting elements; a state switch step of carrying out, by using a predetermined finite state machine, switching between scene states of the maximum possible existing area according to predetermined different scene states and switching conditions; and a display step of extracting, based on a current scene state switched by the state switch step, an area of concern coinciding with the current scene state from the maximum possible existing area to serve as a scene video for display.

Since the finite state machine is utilized for dynamically detecting the area of concern, it is possible to provide better display of the area of concern for users; in the meantime, the atmosphere of the whole scene may be guaranteed. Furthermore the arrangement of a place, parameters such as size, shape, the number of attendees, etc., may be different, and during the whole process of an event (such as a conference, medical care, etc.), there may be different scenes; as a result, by utilizing the techniques in the embodiments of the present invention, it is possible to effectively employ the area-of-concern dynamic detection to flexibly provide a best video.

In addition, in order to obtain the maximum possible existing area of the interesting elements, not only the interesting elements but also the latent elements are considered. The positions of the latent elements are those where new interesting elements may appear. As a result, by further utilizing a tracking mechanism, it is possible to easily take leave of the present interesting elements and take attendance of the new interesting elements.

Furthermore, by further adopting a display enhancement technique based on super resolution and predetermined visual quality, it is also possible to improve the visual quality of a video even in a case where the visual quality of the original video is relatively poor.

BRIEF DESCRIPTION OF THE DRAWINGS

FIG. 7A illustrates an example of scene state switching according to another embodiment of the present invention;

FIG. 7B illustrates a scene state switching table corresponding to the scene state switching shown in FIG. 7A.

DETAILED DESCRIPTION OF THE PREFERRED EMBODIMENTS

Hereinafter, various embodiments of the present invention will be concretely described with reference to the drawings. However it should be noted that the same symbols, which are in the specification and the drawings, stand for constructional elements having the basically-same function and structure, and repeated explanations for the constructional elements are omitted.

Figure 1:
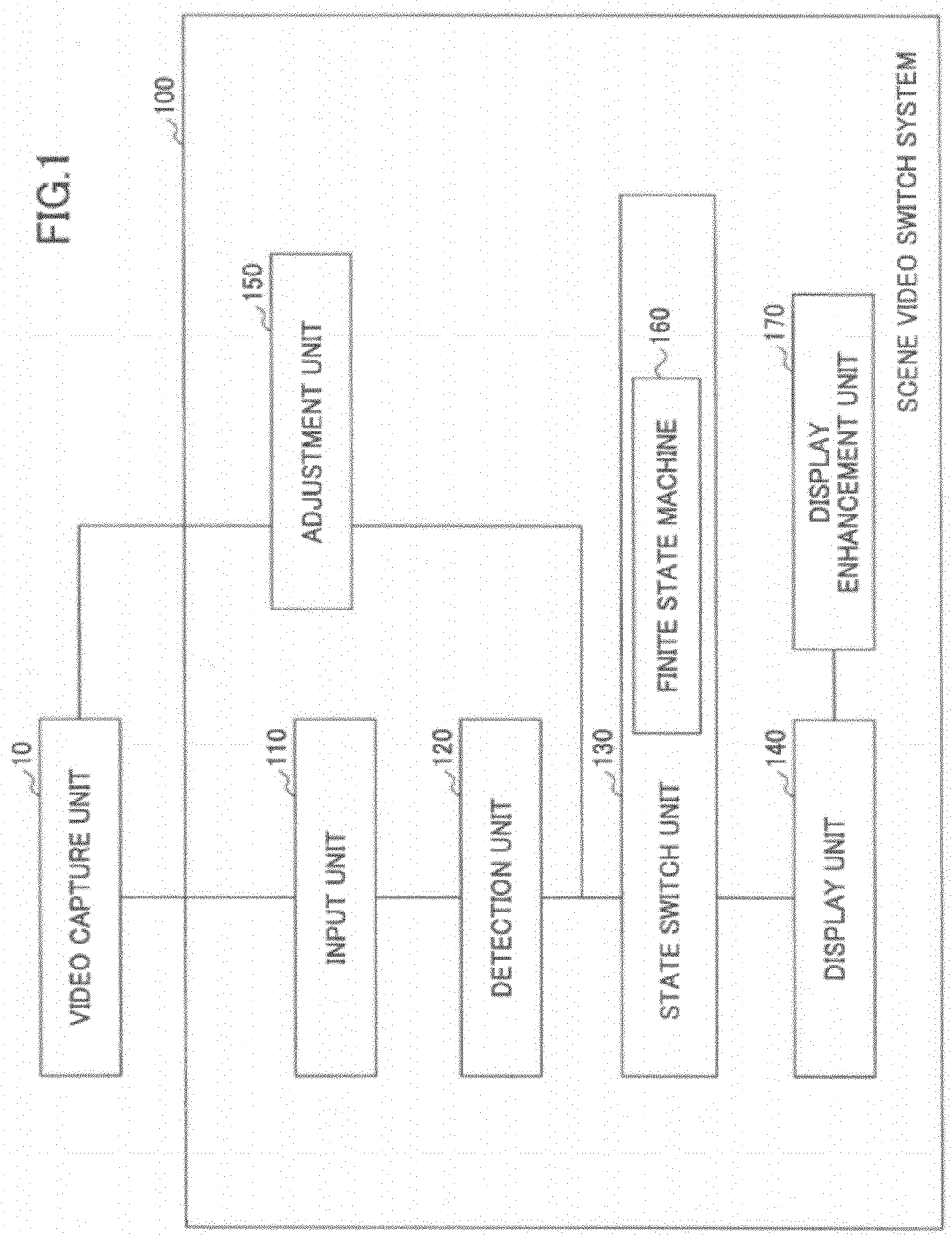
FIG. 1 is a block diagram of a scene video switch system based on area-of-concern dynamic detection, according to an embodiment of the present invention.

FIG. 1 is a block diagram of a scene video switch system 100 based on area-of-concern dynamic detection, according to an embodiment of the present invention.

Here it should be noted that the area of concern is also called as "region of interest (ROI)".

As shown in FIG. 1, the scene video switch system 100 based on area-of-concern dynamic detection includes an input unit 110 configured to input an image currently captured by a video capture unit 10 to serve as a current image; a detection unit 120 configured to detect all of interesting elements and latent elements in the current image input by the input unit 110 so as to determine a maximum possible existing area of the interesting elements; a state switch unit 130 configured to carry out, by using a predetermined finite state machine (FSM) 160, switching between scene states of the maximum possible existing area according to predetermined different scene states and switching conditions; and a display unit 140 configured to extract, based on a current scene state switched by the state switch unit 130, an area of concern coinciding with the current scene state from the maximum possible existing area to serve as a scene video for display.

In a case where the scene video switch system 100 is used in a remote conference system, the corresponding place may be a conference room; in a case where the scene video switch system 100 is used in a remote medical care system, the corresponding place may be, for example, a clinic and even an operating room.

Here it should be noted that in what follows, the scene video switch system 100 is illustrated by taking an example of being used in the remote conference system. However, those people skilled in the art should understand that the scene video switch system 100 is not limited to being used in the remote conference system; in other words, the scene video switch system 100 may be used in other proper remote video systems.

The video capture unit 10 is configured to capture video images of the place, and may be a video imaging unit such as a camera head, a video camera, etc.; the lens of the video capture unit 10 may be a general, full-angle, or wide-angle one.

In addition, the interesting elements may be attendees in the place; the latent elements may be predetermined positions where the attendees may appear, for example, unoccupied chairs, a whiteboard, and a slide projector.

Figure 2:
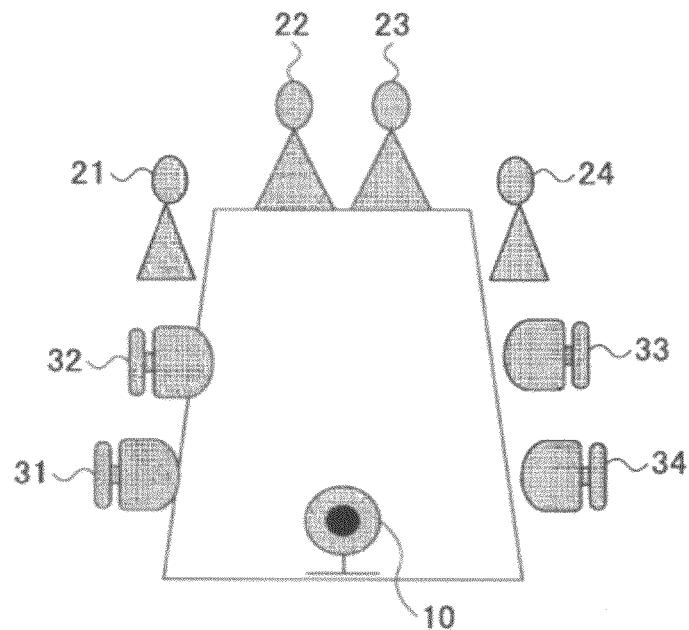
FIG. 2 illustrates a conference place in case where a remote conference system is taken as an example.

FIG. 2 illustrates a conference place in a case where a remote conference system is taken as an example.

In FIG. 2, there are the video capture unit 10, attendees (i.e. persons present in the conference place) 21, 22, 23, and 24, and unoccupied chairs 31, 32, 33, and 34. Here it is apparent that in the remote conference system that may use the scene video switch system 100, the number of attendees is not limited to four, latent positions where the attendees may appear are not limited to unoccupied chairs, and the number of the unoccupied chairs is not limited to four.

Figure 3:
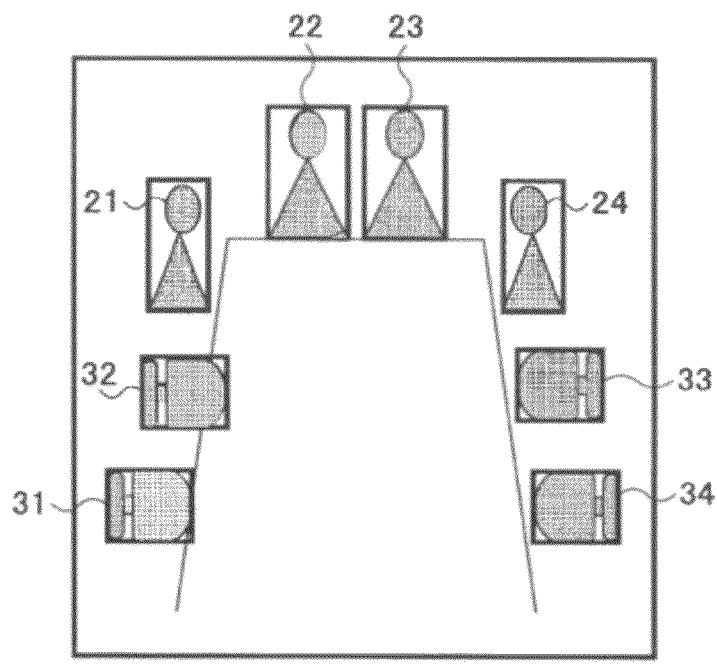
FIG. 3 illustrates an image captured by a video capture unit in the conference place shown in FIG. 2.

FIG. 3 illustrates an image captured by the video capture unit 10 in the conference place shown in FIG. 2.

As for the image captured by the video capture unit 10, i.e., the current image, the detection unit 120 may detect and obtain a foreground image from the current image by carrying out foreground object detection of dynamic background modeling based on a Gaussian mixture model (GMM), then may detect the attendees in the foreground image by carrying out human face and human head detection, and then may detect the latent positions where the attendees may appear, in the current image, by carrying out detection where features are pre-determined or by carrying out training with regard to data sets in advance.

Here it should be noted that the foreground object detection of dynamic background modeling based on the Gaussian mixture model, the human face and human head detection, and the detection where features are pre-determined, carried out with regard to the unoccupied chairs, the whiteboard, the slide projector, etc. may be achieved by employing the relevant conventional techniques. The reason why not only the attendees but also the latent positions such as the unoccupied chairs, etc., are detected, is that departure of the present attendees and attendance of new attendees are considered in order to obtain a maximum possible existing area including the attendees as many as possible.

Figure 4:
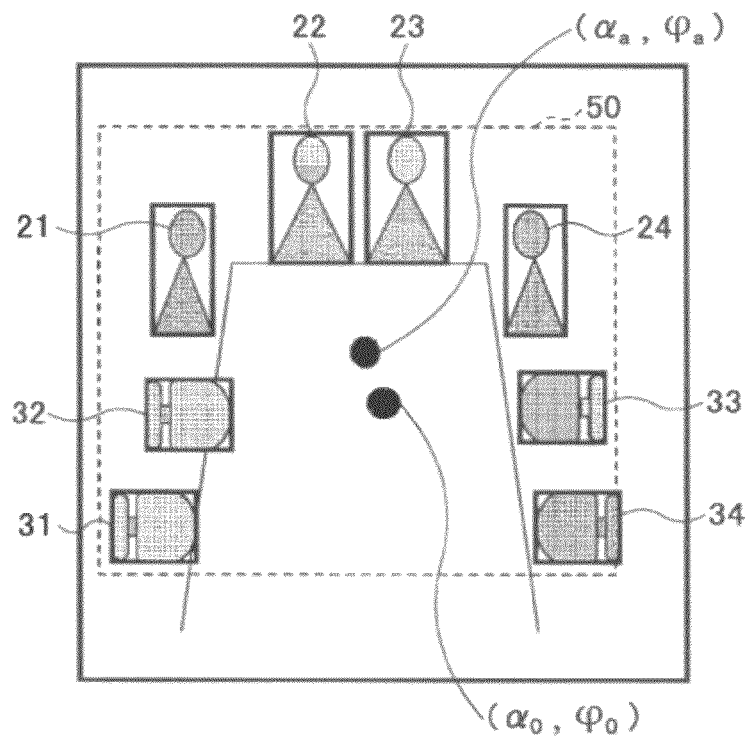
FIG. 4 illustrates a maximum possible existing area determined in the image shown in FIG. 3.

FIG. 4 illustrates a maximum possible existing area determined in the current image shown in FIG. 3.

In FIG. 4, a point ($\alpha_0$, $\phi_0$) refers to the central point of the current image captured by the video capture unit 10; a dotted frame refers to a determined maximum possible existing area 50 of the attendees; and a point ($\alpha_a$, $\phi_a$) refers to the central point of the maximum possible existing area 50.

The maximum possible existing area 50 is a rectangle including all of the interesting elements and the latent elements. The left side of the rectangle is the detected left side of the interesting elements or the latent elements located on the left-most portion of the rectangle. The top side of the rectangle is the detected top side of the interesting elements or the latent elements located on the top-most portion of the rectangle. The right side of the rectangle is the detected right side of the interesting elements or the latent elements located on the right-most portion of the rectangle. The bottom side of the rectangle is the detected bottom side of the interesting elements or the latent elements located on the bottom-most portion of the rectangle. The sides and the central point of the rectangle may be determined by adopting the conventional techniques in computer graphics.

The scene video switch system 100 carries out processing and operations such as extraction of an area of concern, switching between scene states, etc., with regard to the maximum possible existing area 50. As a result, as an improvement of the system, the scene video switch system 100 may preferably include an adjustment unit 150 (shown in FIG. 1) configured to calculate, based on a positional relationship between the current image and the maximum possible existing area 50, angles by which the video capture unit 10 needs to rotate in horizontal and vertical directions in order to let the central point of the imaging range of the video capture unit 10 move to the central point of the maximum possible existing area 50. In addition, the adjustment unit 150 adjusts the width and length of the maximum possible existing area 50 within the imaging range of the video capture unit 10.

For example, based on the imaging range of the video capture unit 10, the determined maximum possible existing area 50, and the innate parameters of the video capture unit 10, the adjustment unit 150 may calculate an angle by which the lens of the video capture unit 10 needs to rotate (pan) in the horizontal direction, an angle by which the lens of the video capture unit 10 needs to rotate (tilt) in the vertical direction, and a zoom ratio in order to make it possible for the imaging range of the video capture unit 10 be filled with all of the areas needing to be paid attention to, including all of the attendees and latent positions. The rotation angles and zoom ratio may be called as "PTZ parameters", and the adjustment unit 150 adjusts the video capture unit 10 according to the calculated PTZ parameters.

The needed PTZ parameters may be calculated by adopting the conventional techniques in computer graphics and computer image processing. An example of an image captured by the video capture unit 10 after being adjusted by the adjustment unit 150 is shown in FIG. 5.

Figure 5:
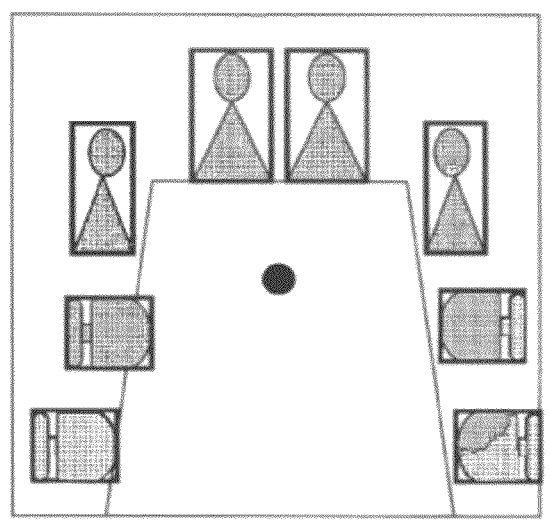
FIG. 5 illustrates an image captured by the video capture unit after being adjusted by an adjustment unit.

FIG. 5 illustrates an image of the place shown in FIG. 1, captured by the video capture unit 10 after being adjusted by an adjustment unit 150.

In FIG. 5, the image is possibly filled by the maximum possible existing area 50. The central point of the rectangle is both the central point of the current image and the central point of the maximum possible existing area 50.

In what follows, scene state switching and the corresponding display processing of an area of concern, which are carried out by the scene video switch system 100 with regard to a maximum possible existing area by utilizing a finite state machine, are illustrated.

In FIG. 1, there is the finite state machine 160 that is pre-defined as a set of scene states, an initial scene state, a set of ending scene states, and a set of switching conditions of the scene states. Each of the scene states has an initial score, a velocity of change of score with regard to time, and an innate value. Each of the switching conditions corresponds to a switching operation.

The state switch unit 130 determines, by detecting occurrence of a predetermined event and/or calculating and comparing a real-time score of one of the scene states, whether one of the switching conditions of the scene states is satisfied. In a case where one of the switching conditions of the scene states is satisfied, a current scene state is switched to the corresponding scene state, and the score of the corresponding scene state is changed.

In a case of, for example, a video conference, areas of concern are different according to different scene states.

Figures 6A, 6B:
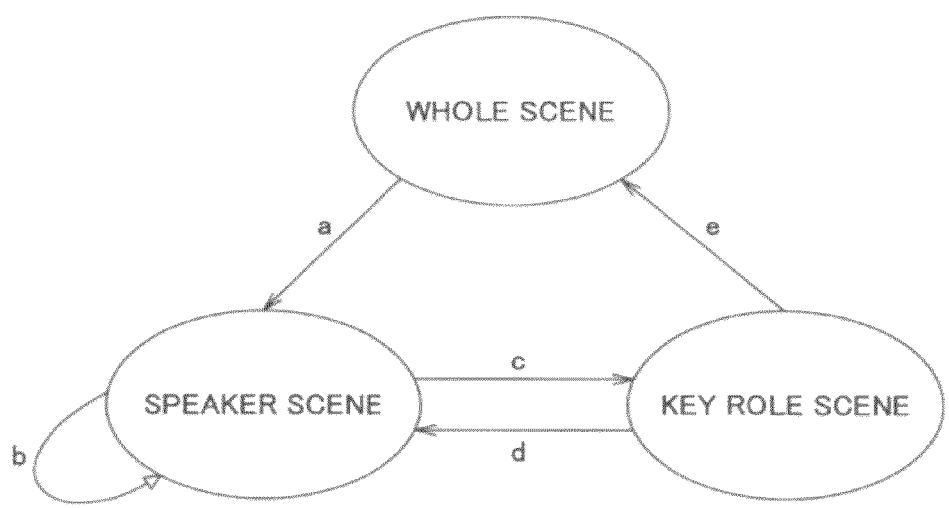
FIG. 6A illustrates an example of scene state switching according to an embodiment of the present invention.
FIG. 6B illustrates a scene state switching table corresponding to the scene state switching shown in FIG. 6A.

FIG. 6A illustrates an example of scene state switching according to an embodiment of the present invention. FIG. 6B illustrates a scene state switching table corresponding to the scene state switching shown in FIG. 6A.

In the example shown in FIG. 6A, scene states of a video conference are divided into a speaker scene, a key role scene, and a whole scene including all present persons. However, those people skilled in the art should understand that the scene states are not limited to these three types; in other words, other proper scenes may be included. In addition, a key role in the key role scene may be selected by a user in the above described maximum possible existing area in advance.

The finite state machine 160 may be defined as follows.

$$A=(Q, \sigma, q_0, F)$$

Here A refers to the finite state machine 160; Q={whole scene, speaker scene, key role scene}, i.e., a set of scene states; $q_0$={whole scene}, and serves as an initial scene state (those people skilled in the art should understand that other scene states may serve as the initial scene state too); F={whole scene, speaker scene, key role scene}, i.e., a set of ending scene states; and σ={a, b, c, d, e}, i.e., a set of switching conditions a, b, c, d, and e (in a case where one of the switching conditions is satisfied, the corresponding switching operation is carried out).

Each of the scene states has a real-time score. The real-time score of the whole scene state is expressed as $S_{whole}$. The real-time score of the speaker scene state is expressed as $S_{speaker}$. The real-time score of the key role scene state is expressed as $S_{key}$. The score of each of the scene states at the initial time (time t=0) is the corresponding initial score. The initial score of each of the scene states may be the same value, and is expressed as $S_0$. However, those people skilled in the art should understand that the initial scores of the respective scene states may be different according to the concrete design requirements of the scene video switch system 100. The velocity of change of the whole scene state score with regard to time is expressed as $v_w$. The velocity of change of the speaker scene state score with regard to time is expressed as $v_s$. The velocity of change of the key role scene state score with regard to time is expressed as $v_k$. The innate value of the whole scene state is expressed as $S_1$. The innate value of the speaker scene state is expressed as $S_2$. The innate value of the key role scene state is expressed as $S_3$. Each of the innate values is a predetermined constant, may be considered as the adjustment amount of the corresponding scene state switching condition, and may be changed according to the concrete design requirements. The parameter t refers to the elapsed time from the beginning time 0. In addition, the initial score of each of the scene states, t, the velocity of change of each of the scores with regard to time, and the innate value of each of the scene states are positive values.

Here it is assumed that when t=0, the scores of the respective scene states are the same value, i.e., $S_{whole}=S_{speaker}=S_{key}=S_0$. However, those people skilled in the art should understand that the initial scores of the respective scene states may be different according to the concrete design requirements. In addition, it is assumed that the whole scene state is the initial scene state. However, those people skilled in the art should understand that other proper scene states may serve as the initial scene state according to the concrete design requirements too.

The switching conditions of the different scene states may be that an event is detected, and/or the real-time scores of the scene states are calculated and compared. If one of the switching conditions is satisfied, then the corresponding switching operation is triggered.

In this example, switching conditions of the scene states are a, b, c, d, and e. In FIG. 6A, arrows represent switch directions of the scene states when the switching conditions are satisfied. In FIG. 6B, each of the switching conditions a, b, c, d, and e represents that the corresponding switch is from the state in the left-most column and in the row corresponding to the switching condition to the state in the top-most row and in the column corresponding to the switching condition. For example, the switching condition a means that the corresponding switch is from the whole scene state (that is in the left-most column and in the row corresponding to the switching conditioning a) to the speaker scene state (that is in the top-most row and in the column corresponding to the switching condition a). In addition, "-" represents that there is no switch from the state in the row corresponding to "-" to the state in the column corresponding to "-".

The switching conditions a, b, c, d, and e are concretely designed as follows.

a: detecting a new speaker, then calculating $S_{whole}$ ($S_{whole}=S_{whole}+v_w*t$), and then determining whether $S_{whole}>S_1$. The switching operation corresponding to the switching condition a is switching from the whole scene state to the speaker scene state, and calculating $S_{speaker}$ ($S_{speaker}=S_{speaker}+S_2$).

b: detecting a new speaker. The switching operation corresponding to the switching condition b is switching from the speaker scene state to the speaker scene state, and calculating $S_{speaker}$ ($S_{speaker}=S_O+S_2$). Since there may be different speakers, from the angle of scene state types, the scene switch corresponding to the switching condition b is from the speaker scene state to itself. However, regarding the scene state types of the speaker scene, as illustrated below, an area of concern may be changed since a different speaker may be detected; as a result, the scene states of the speaker scene correspond to the areas of concern based on different speakers. As for extraction of the area of concern, it will be illustrated below.

c: calculating $S_{speaker}$ ($S_{speaker}=S_{speaker}-v_s*t$), and then determining whether $S_{speaker}<S_{key}$. The switching operation corresponding to the switching condition c is switching from the speaker scene state to the key role scene state.

d: detecting a new speaker, then calculating $S_{key}$ ($S_{key}=S_{key}+v_k*t$), and then determining whether $S_{key}>S_3$. The switching operation corresponding to the switching condition d is switching from the key role scene state to the speaker scene state, and calculating $S_{speaker}$ ($S_{speaker}=S_{speaker}+S_2$).

e: calculating $S_{key}$ ($S_{key}=S_{key}+v_k*t$), and then determining whether $S_{key}>S_3$. The switching operation corresponding to the switching condition e is switching from the key role scene state to the whole scene state, and letting $S_{whole}=S_{speaker}=S_{key}=S_O$.

FIG. 7A illustrates an example of scene state switching according to another embodiment of the present invention. FIG. 7B illustrates a scene state switching table corresponding to the scene state switching shown in FIG. 7A.

In the example shown in FIG. 7A, scene states of a video conference are divided into a speaker scene, a key role scene, an individual scene (hereinafter it is called as "single scene"), and a whole scene including all attendees. However, those people skilled in the art should understand that the scene states are not limited to these four types; in other words, other proper scenes may be included. In addition, a key role in the key role scene may be selected by a user in the above mentioned maximum possible existing area in advance.

The finite state machine 160 may be defined as follows.

$$A=(Q,\sigma,q_0,F)$$

Here A refers to the finite state machine 160; Q={whole scene, speaker scene, key role scene, single scene}, i.e., a set of scene states; $q_0$={whole scene}, and serves as an initial scene state (those people skilled in the art should understand that other scene states may serve as the initial scene state too); F={whole scene, speaker scene, key role scene, single scene}, i.e., a set of ending scene states; and σ={a, b, c, d, e, f1, f2, f3, g, h}, i.e., a set of switching conditions a, b, c, d, e, f1, f2, f3, g, and h (in a case where one of the switching conditions is satisfied, the corresponding switching operation is carried out).

Each of the scene states has a real-time score. The real-time score of the whole scene state is expressed as $S_{whole}$. The real-time score of the speaker scene state is expressed as $S_{speaker}$. The real-time score of the key role scene state is expressed as $S_{key}$. The real-time score of the single scene state is expressed as $S_{single}$. The score of each of the scene states at the initial time (time t=0) is the corresponding initial score. The initial score of each of the scene states may be the same value, and is expressed as $S_0$. However, those people skilled in the art should understand that the initial scores of the respective scene states may be different according to the concrete design requirements of the scene video switch system 100. The velocity of change of the whole scene state score with regard to time is expressed as $v_w$. The velocity of change of the speaker scene state score with regard to time is expressed as $v_s$. The velocity of change of the key role scene state score with regard to time is expressed as $v_k$. The velocity of change of the single scene state score with regard to time is expressed as $v_s$. The innate value of the whole scene state is expressed as $S_1$. The innate value of the speaker scene state is expressed as $S_2$. The innate value of the key role scene state is expressed as $S_3$. The innate value of the single scene state is expressed as $S_4$. Each of the innate values is a predetermined constant, may be considered as the adjustment amount of the corresponding scene state switching condition, and may be changed according to the concrete design requirements. The parameter t refers to the elapsed time from the beginning time 0. In addition, the initial score of each of the scene states, t, the velocity of change of each of the scores with regard to time, and the innate value of each of the scene states are positive values.

Here it is assumed that when t=0, the scores of the respective scene states are the same value, i.e., $S_{whole}=S_{speaker}=S_{key}=S_{single}=S_0$. However, those people skilled in the art should understand that the initial scores of the respective scene states may be different according to the concrete design requirements. In addition, it is assumed that the whole scene state is the initial scent state. However, those people skilled in the art should understand that other proper scene states may serve as the initial scene state according to the concrete design requirements too.

The switching conditions of the different scene states may be that an event is detected, and/or the real-time scores of the scene states are calculated and compared. If one of the switching conditions is satisfied, then the corresponding switching operation is triggered.

In this example, switching conditions of the scene states are a, b, c, d, e, f1, f2, f3, g, and h. In FIG. 7A, arrows represent switch directions of the scene states when the switching conditions are satisfied. In FIG. 7B, each of the switching conditions a, b, c, d, e, f1, f2, f3, g, and h represents that the corresponding switch is from the state in the left-most column and in the row corresponding to the switching condition to the state in the top-most row and in the column corresponding to the switching condition. For example, the switching condition a means that the corresponding switch is from the whole scene state (that is in the left-most column and in the row corresponding to the switching condition) to the speaker scene state (that is in the top-most row and in the column corresponding to switching condition a). In addition, "-" represents that there is no switch from the state in the corresponding row to the state in the corresponding column.

The switching conditions a, b, c, d, e, f1, f2, f3, g, and h are concretely designed as follows.

a: detecting a new speaker, then calculating $S_{whole}$ ($S_{whole}=S_{whole}+v_w*t$), and then determining whether $S_{whole}>S_1$. The switching operation corresponding to the switching condition a is switching from the whole scene state to the speaker scene state, and calculating $S_{speaker}$ ($S_{speaker}=S_{speaker}+S_2$).

b: detecting a new speaker. The switching operation corresponding to the switching condition b is switching from the speaker scene state to the speaker scene state, and calculating $S_{speaker}$ ($S_{speaker}=S_O+S_2$). Since there may be different speakers, from the angle of scene state types, the scene switch corresponding to the switching condition b is from the speaker scene state to itself. However, regarding the scene state types of the speaker scene, as illustrated below, an area of concern may be changed since a different speaker may be detected; as a result, the scene states of the speaker scene correspond to the areas of concern based on different speakers. As for extraction of the area of concern, it will be illustrated below.

c: calculating $S_{speaker}$ ($S_{speaker}=S_{speaker}-v_s*t$), and then determining whether $S_{speaker}<S_{key}$. The switching operation corresponding to the switching condition c is switching from the speaker scene state to the key role scene state.

d: detecting a new speaker, then calculating $S_{key}$ ($S_{key}=S_{key}+v_k*t$), and then determining whether $S_{key}>S_3$. The switching operation corresponding to the switching condition d is switching from the key role scene state to the speaker scene state, and calculating $S_{speaker}$ ($S_{speaker}=S_{speaker}+S_2$).

e: calculating $S_{key}$ ($S_{key}=S_{key}+v_k*t$), and then determining whether $S_{key}>S_3$. The switching operation corresponding to the switching condition e is switching from the key role scene state to the whole scene state, and letting $S_{whole}=S_{speaker}=S_{key}=S_{single}=S_O$.

f1: detecting attendance of a new attendee, then calculating $S_{whole}$ ($S_{whole}=S_{whole}+v_w*t$), and then determining whether $S_{whole}>S_1$. The switching operation corresponding to the switching condition f1 is switching from the whole scene state to the single scene state, and calculating $S_{single}$ ($S_{single}=S_{single}+S_4$).

f2: calculating $S_{speaker}$ ($S_{speaker}=S_{speaker}-v_s*t$), then determining whether $S_{speaker}<S_{single}$. The switching operation corresponding to the switching condition f2 is switching from the speaker scene state to the single scene state, and calculating $S_{single}$ ($S_{single}=S_{single}+S_4$).

f3: detecting attendance of a new attendee, then calculating $S_{key}$ ($S_{key}=S_{key}+v_k*t$), and then determining whether $S_{key}>S_3$. The switching operation corresponding to the switching condition f3 is switching from the key role scene state to the single scene state, and calculating $S_{single}$ ($S_{single}=S_{single}+S_4$).

g: calculating $S_{single}$ ($S_{single}=S_{single}-v_s*t$), then determining whether $S_{single}<S_{key}$. The switching operation corresponding to the switching condition g is switching from the single scene state to the key role scene state.

h: detecting attendance of a new attendee. The switching operation corresponding to the switching condition h is switching from the single scene state to the single scene state, and calculating $S_{single}$ ($S_{single}=S_0+S_4$). Similar to the case where the speaker scene may correspond to different speakers, regarding the single scene, since there may be attendance of different new attendees, from the angle of scene state types, the scene switch corresponding to the switching condition h is from the single scene state to itself. However, regarding the scene state types of the single scene, as illustrated below, an area of concern may be changed since a different new member may be detected; as a result, the scene states of the single scene correspond to the areas of concern based on different new members. In addition, since there exits the attendance of the new attendees, the area of concern corresponding to the whole scene is accordingly adjusted to include the new attendees. As for extraction of the area of concern, it will be illustrated below.

Detection of a speaker, attendance of a new attendee, or departure of a present attendee may be carried out by utilizing a conventional audio or/and video detection unit.

Furthermore those people skilled in the art should understand that the finite state machine 160 used in the embodiments of the present invention is not limited to the above described designs. In other words, according to the above description, those people skilled in the art should understand that other proper finite state machines may be adopted in the embodiment of the present invention. For example, any one of the above described scene states may be removed; on the other hand, a proper scene state, for example, turn-displaying respective present attendees or detecting departure of the present attendees, may be added. In addition, other switching conditions and the corresponding switching operations may be designed too.

It is possible to design different scene states for different areas of concern. In a scene state, it is possible to extract an area of concern according to a method similar to the above described method of determining the maximum possible existing area or other conventional image cut methods, and to let the area of concern serve as a scene video needing to be displayed. For example, in a whole scene state, an area of concern may be a rectangle including all present attendees. In a speaker scene state, an area of concern may be a rectangle with a certain range, including a speaker and centered on the speaker. In a key role scene state, an area of concern may be a rectangle with a certain range, including a key role and centered on the key role. In addition, it is preferred to use a normal image processing method to extract and enlarge the area of concern.

Figure 8A:
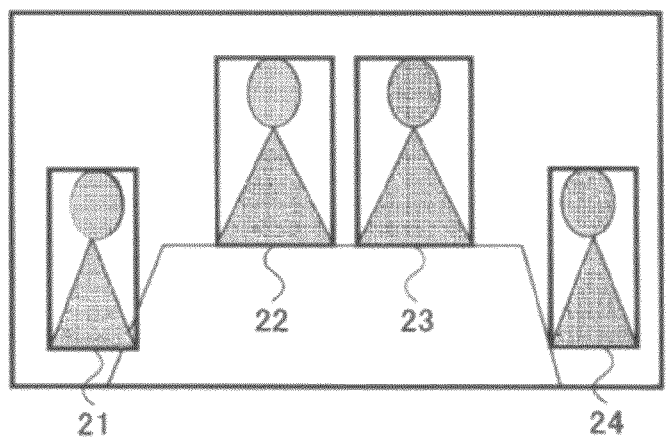
FIGS. 8A~8C illustrate images including different areas of concern extracted under different scene states from the maximum possible existing area shown in FIG. 5, respectively.
Figure 8B:
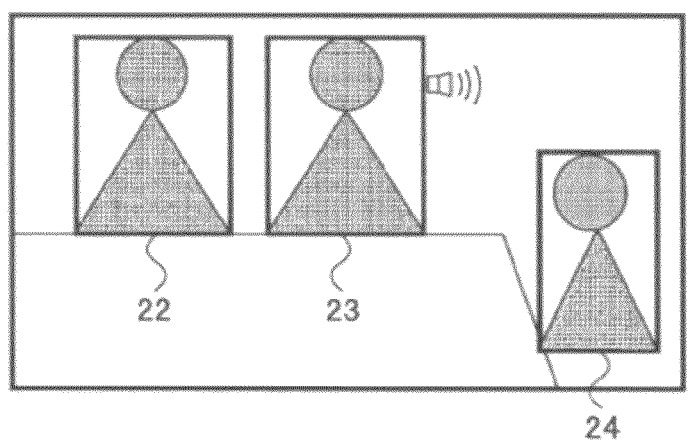
Figure 8C:
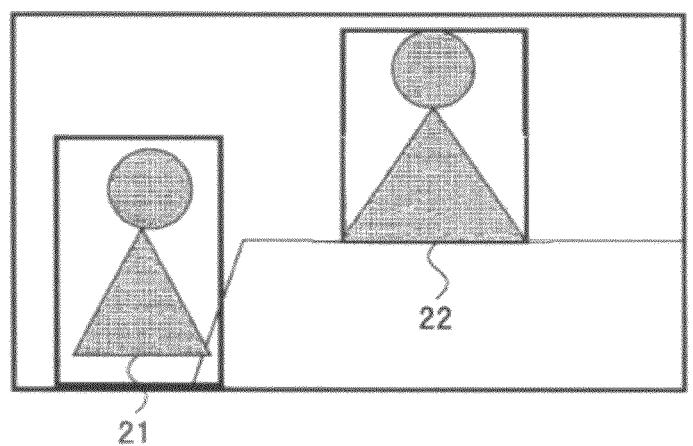

FIGS. 8A~8C illustrate images including different areas of concern extracted under different scene states from the maximum possible existing area shown in FIG. 5, respectively.

FIG. 8A illustrates an enlarged scene video image of an area of concern extracted from the maximum possible existing area shown in FIG. 5. When it is detected that an attendee 23 is speaking, the scene state is switched to the speaker scene state, then an area of concern centered on the attendee 23 is extracted, and then it is enlarged and displayed as shown in FIG. 8B. If attendees 21 and 22 have key roles, then in a case where the corresponding switching condition is satisfied, it is possible to extract an area of concern centered on the attendees 21 and 22, and to enlarge and display the area of concern as shown in FIG. 8C. However, those people skilled in the art should understand that the above described extraction of the areas of concern and the above described display of the scene videos are just examples for purpose of illustration; as a result, various modifications could be made thereto.

As a further improvement of the embodiments of the present invention, it is preferred that the scene video switch system 100 shown in FIG. 1 may further include a display enhancement unit 170 (shown in FIG. 1) configured to determine, according to a current scene state switched by the state switch unit 130, the visual quality of a whole scene video based on resolutions of faces of present attendees in the corresponding area of concern. If the visual quality is lower than a predetermined threshold value, then the visual quality of the scene video is improved.

For example, in a displayed scene video, there may be a case where some present attendees are relatively far away from the video capture unit 10, i.e., the area occupied by the present attendees in the maximum possible existing area is relatively small. In this case, after being cut and enlarged, there may be a problem that the visual quality is relatively poor, for example, too blurred. In order to solve this problem, it is possible to pre-determine a threshold value. If the visual quality of the present members in the video is lower than the threshold value, then the visual quality of the video waiting for transmission and display is improved.

For example, it is possible to utilize the following equation (1) to determine whether the visual quality needs to be improved.

$$\sum_{p_i \in HumanArea} resolution\_p_i / resolution\_current < Th \quad (1)$$

Here resolution_current refers to the resolution of the current scene image i.e. the current video frame; HumanArea refers to the current scene image; resolution_$p_i$ refers to the resolution of the face of the i-th (i is a counting number) present attendee $p_i$; and Th refers to a predetermined threshold value. As for different scene states, the predetermined threshold value Th may be set to different values.

If the above described equation (1) is satisfied, it is determined that the visual quality of the current video frame is relatively poor; then it is possible to choose to improve the visual quality of the current scene video.

Aside from the resolution of the faces of the present attendees in the video frame, a PSNR (peak signal-to-noise ratio) value of each of the faces of the present attendees in the video frame may be used to determine the visual quality. If the calculated PSNR value is less than a predetermined threshold value, the visual quality is considered as being less than ideal; then it is possible to choose to further improve the visual quality.

For example, as for the present attendees who are relatively far away from the video capture unit 10, it is possible to utilize information between frames in the time region so as to obtain higher visual quality. For example, it is possible to utilize the relevant information of a few adjacent frames in the time region so as to restore the concrete details of the respective frames. In particular, it is possible to employ a super-resolution method to carry out the following processing. First video frames needing to be processed are doubled in size by adopting a relatively high quality interpolation operation. Then, by utilizing a pixel movement compensation operation, similar areas are found in the adjacent frames of the current video frames, then pixels are merged, and then the doubled video frames are restored to the original size. In addition, it is also possible to adopt, for example, a linear interpolation approach, a nearest neighbor interpolation approach, a bilinear interpolation approach, and a cubic interpolation approach, to improve the visual quality of the video frames.

According to another embodiment of the present invention, a scene video switch method based on area-of-concern dynamic detection, carried out by the above described scene video switch system 100 is provided. The scene video switch method includes an input step, that may be carried out by the input unit 110, of inputting an image currently captured by the video capture unit 110 to serve as a current image; a detection step, that may be carried out by the detection unit 120, of detecting all of interesting elements and latent elements in the current image input in the input step so as to determine a maximum possible existing area of the interesting elements; a state switch step, that may be carried out by the state switch unit 130, of carrying out, by using a predetermined finite state machine (FSM) 160, switching between scene states of the maximum possible existing area according to predetermined different scene states and switching conditions; and a display step, that may be carried out by the display unit 140, of extracting, based on a current scene state switched in the state switching step, an area of concern coinciding with the current scene state from the maximum possible existing area to serve as a scene video for display.

Furthermore the interesting elements may be present persons (i.e. attendees), and the latent elements may be predetermined positions where the present persons may appear.

Furthermore, in the detection step, it is possible to detect and obtain a foreground image in the current image by carrying out foreground object detection of dynamic background modeling based on Gaussian mixture model. It is possible to detect the present persons in the foreground image by carrying out human face and human head detection. It is also possible to detect the predetermined positions, where the present persons may appear, by carrying out detection where features are pre-determined.

Furthermore the maximum possible existing area may be a rectangle including all of the interesting elements and the latent elements. The left side of the rectangle may be the detected left side of the interesting elements or the latent elements located on the left-most portion of the rectangle. The top side of the rectangle may be the detected top side of the interesting elements or the latent elements located on the top-most portion of the rectangle. The right side of the rectangle may be the detected right side of the interesting elements or the latent elements located on the right-most portion of the rectangle. The bottom side of the rectangle may be the detected bottom side of the interesting elements or the latent elements located on the bottom-most portion of the rectangle.

The scene video switch method may further include an adjustment step, that may be carried out by the adjustment unit 150, of adjusting the video capture unit 10 so as to calculate, based on a positional relationship between the current image and the maximum possible existing area, angles by which the video capture unit 10 needs to rotate in horizontal and vertical directions in order to let the central point of the imaging range of the video capture unit 10 move to the central point of the maximum possible existing area.

Furthermore, in the adjustment step, the width and the length of the maximum possible existing area are adjusted within the imaging range of the video capture unit 10.

The finite state machine 160 may be pre-defined as a set of scene states, an initial scene state, a set of ending scene states, and a set of switching conditions of the scene states. Each of the scene states has an initial score, a velocity of change of score with regard to time, and an innate value. Each of the switching conditions corresponds to a switching operation.

Furthermore, in the state switch step, it is possible to determine, by detecting occurrence of a predetermined event and/or calculating and comparing a real-time score of a scene state, whether one of the switching conditions of scene states is satisfied. In a case where one of the switching conditions of the scene states is satisfied, a current scene state is switched to the corresponding scene state, and the score of the corresponding scene state is changed.

The scene video switch method may further include a display enhancement step, that may be carried out by the display enhancement unit 170, of determining, according to the current scene state switched by the state switch unit 130, the visual quality of the whole scene video based on resolutions of faces of the present persons in the corresponding area of concern. If the visual quality is lower than a predetermined threshold value, then the visual quality of the scene video is improved.

The embodiments of the present invention may be applied to various video systems such as a video conference system, a remote medical care system, etc. Not only the interesting elements but also the latent elements are considered; as a result, it is possible to obtain the maximum possible existing area of the interesting elements by determining a video capture range of the video capture unit based on detection of the interesting elements and the latent elements. Furthermore the area of concern is dynamically detected by utilizing the mechanism of the finite state machine, and then is extracted and remotely displayed; as a result, it is possible to provide the best video for users of a remote video system. In addition, it is preferred that the display enhancement technique based on the super resolution and the predetermined visual quality be further adopted; as a result, it is possible to effectively improve the visual quality of the video although the visual quality of the original video is relatively poor.

A series of operations described in this specification may be executed by hardware, software, or a combination of the hardware and the software. When the operations are executed by the software, a computer program may be installed in a dedicated built-in storage device of a computer so that the computer may execute the computer program. Alternatively, the computer program may be installed in a common computer by which various types of processes may be executed so that the common computer may execute the computer program.

For example, the computer program may be stored in a recording medium such as a hard disk or a ROM in advance. Alternatively, the computer program may be temporarily or permanently stored (or recorded) in a movable recording medium such as a floppy disk, a CD-ROM, a MO disk, a DVD, a magic disk, or a semiconductor storage unit. In addition, it is possible to have these kinds of movable recording media serve as packaged software for purpose of distribution.

While the present invention is described with reference to the specific embodiments chosen for purpose of illustration, it should be apparent that the present invention is not limited to these embodiments, but numerous modifications could be made thereto by those skilled in the art without departing from the basic concept and scope of the present invention.

The present application is based on Chinese Priority Patent Application No. 201110021338.1 filed on Jan. 19, 2011, the entire contents of which are hereby incorporated by reference.

What is claimed is:

1. A scene video switch system based on area-of-concern dynamic detection, comprising:
    an input unit configured to input an image currently captured by a video capture unit to serve as a current image;
    a detection unit configured to detect all of interesting elements and latent elements in the current image input by the input unit so as to determine a maximum possible existing area of the interesting elements;
    a state switch unit configured to carry out, by using a predetermined finite state machine, switching between scene states of the maximum possible existing area according to predetermined different scene states and switching conditions; and
    a display unit configured to extract, based on a current scene state switched by the state switch unit, an area of concern coinciding with the current scene state from the maximum possible existing area to serve as a scene video for display,
    wherein the predetermined finite state machine is predetermined as a set of scene states, an initial scene state, a set of ending scene states, and a set of switching conditions of the scene states; each of the scene states has an initial score, a velocity of change of score with regard to time, and an innate value; and each of the switching conditions corresponds to a switching operation.

2. The scene video switch system according to claim 1, wherein:
    the interesting elements are present persons, and the latent elements are predetermined positions where the present persons may appear.

3. The scene video switch system according to claim 2, wherein:
the detection unit detects a foreground image from the current image by carrying out foreground object detection of dynamic background modeling based on Gaussian mixture model, then detects the present persons in the foreground image by carrying out human face and human head detection, and then detects the predetermined positions, where the present persons may appear, in the current image by carrying out detection where features are pre-determined.

4. The scene video switch system according to claim 2, wherein:
the maximum possible existing area is a rectangle including all of the interesting elements and the latent elements; a left side of the rectangle is a detected left side of the interesting elements and the latent elements located on a left-most portion of the rectangle; a top side of the rectangle is a detected top side of the interesting elements and the latent elements located on a top-most portion of the rectangle; a right side of the rectangle is a detected right side of the interesting elements and the latent elements located on a right-most portion of the rectangle; and a bottom side of the rectangle is a detected bottom side of the interesting elements and the latent elements located on a bottom-most portion of the rectangle.

5. The scene video switch system according to claim 1, further comprising:
an adjustment unit configured to calculate, based on a positional relationship between the current image and the maximum possible existing area, angles by which the video capture unit needs to rotate in horizontal and vertical directions so as to let a central point of a imaging range of the video capture unit move to a central point of the maximum possible existing area.

6. The scene video switch system according to claim 5, wherein:
the adjustment unit adjusts, within the imaging range of the video capture unit, width and height of the maximum possible existing area.

7. The scene video switch system according to claim 1, wherein:
the state switch unit determines, by detecting occurrence of a predetermined event and/or calculating and comparing a real-time score of one of the scene states, whether one of the switching conditions of the scene states is satisfied; in a case where one of the switching conditions of the scene states is satisfied, a scene state is switched to a corresponding scene state, and/or a real-time score of the corresponding scene state is changed.

8. The scene video switch system according to claim 2, further comprising:
a display enhancement unit configured to determine, according to the current scene state switched by the state switch unit, visual quality of a whole of the scene video based on resolutions of faces of the present persons in the corresponding area of concern; if the visual quality is lower than a predetermined threshold value, then the visual quality of the scene video is improved.

9. A scene video switch method based on area-of-concern dynamic detection, comprising:
an input step of inputting an image currently captured by a video capture unit to serve as a current image;
a detection step of detecting all of interesting elements and latent elements in the current image input by the input step so as to determine a maximum possible existing area of the interesting elements;
a state switch step of carrying out, by using a predetermined finite state machine, switching between scene states of the maximum possible existing area according to predetermined different scene states and switching conditions; and
a display step of extracting, based on a current scene state switched by the state switch step, an area of concern coinciding with the current scene state from the maximum possible existing area to serve as a scene video for display,
wherein the predetermined finite state machine is predetermined as a set of scene states, an initial scene state, a set of ending scene states, and a set of switching conditions of the scene states; each of the scene states has an initial score, a velocity of change of score with regard to time, and an innate value; and each of the switching conditions corresponds to a switching operation.

* * * * *